ANTIBIOTIC PRODUCED BY PSEUDOMONAS SYRINGAE

James E. De Vay, 1302 B St., Davis, Calif.
No Drawing. Filed Jan. 11, 1963, Ser. No. 250,762
10 Claims. (Cl. 167—65)

This invention relates to an antibiotic substance and to a method for its production. More particularly, the invention relates to an antibiotic substance produced by the bacterium Pesudomonas syringae.

Cankers on stone fruit trees can be caused by several different fungi, bacteria and at least one virus. In certain areas of the country, particularly in California, perhaps the most serious is the bacterial canker caused by Pseudomonas syringae. This bacterium is most active in the fall and winter months producing cankers which originate primarily in nodal areas. After infection the bacterial cells multiply and move quickly through cortex tissues producing cankers which appear as depressed, water-soaked areas, with a characteristic brown color and sour smell. Occasionally these cankers develop small branches and extend to the main scaffold limbs which are often girdled and killed. In addition to canker, Pseudomonas syringae can cause leaf spots and a blasting of blossoms which are particularly serious on almonds.

This invention is based upon my discovery that the toxin produced by Pseudomonas syringae, which toxin is apparently the causative agent of the cankers in stone fruit trees, is highly effective as an antibiotic against a great many pathogenic organisms. Thus, when pathogenic isolates, of varying virulence, of Pseudomonas syringae from diseased plant tissues were purified by dilution plate methods or single cell techniques, and the cut ends of young peach twigs of 2–3 terminals leaves were set in sterile agar containing the toxin or isolates, cankers developed from the base of the twigs upwards. The rate of browning and tissue necrosis was proportional to the relative virulence of the bacteria which produced the toxin and which were growing on the agar at least 1–2 cm. from the base of the twigs. Twigs set in agar free of the bacterial metabolites remained green. Surprisingly, repeated isolations from the necrotic tissues were sterile whereas isolations from the green tisues yielded various fungi and bacteria.

When mixed cultures of the fungus Cytospora spp. and the P. syringae were prepared, it was found that the virulence of the bacterial isolates on stone fruits was reflected in their inhibition of growth of Cytospora. The more virulent the bacterial isolate was on stone fruits, the more antibiotic it was toward the isolates of Cytospora. Nor was the inhibition of Cytospora caused by changes in the pH of the culture medium, since the toxin was active in agar over a wide range of pH and the pH of the inhibition zones around colonies of Cytospora did not differ from the pH of areas in the culture where there was no inhibition of growth.

Additional studies on the toxin were made by attaching broth cultures of the P. syringae isolates to the trunks of intact two year old apricot, plum, peach and cherry trees. The lower end of the culture tubes was sealed with a bacterial filter which allowed free passage of only the culture liquid. The filter was pressed against a small opening cut in the bark, and the culture liquid was then drawn in by the tree. Uninoculated broth which served as a control caused a limited amount of necrosis whereas cell-free filtrates from virulent bacterial cultures caused considerable necrosis and streaking in the plant tissues. Again surprisingly, isolations from the controls yielded various fungi and bacteria, whereas isolations from the tissues affected by the bacaterial toxin were sterile.

The antibiotic substance produced by P. syringae Van Hall and related bacteria causing cankers on stone fruit trees as described herein has been found to have a marked highly effective antibotic effect on a number of pathogenic bacteria and fungi. The broad spectrum of this antibiotic substance is illustrated by the following partial list of pathogenic organisms which it inhibits:

Phytophthora citrophthora
Pythium ultimum
Sclerotinia fructicola
Taphrina deformans
Aspergillus oryzae
Botrytis cinerea
Cytospora rubescens
Pseudomonas savastanoi
Xanthomonas malvacearum
Escherichia coli
Fusarium moniliforme
Geotrichum candidum
Helminthosporium sativum
Hendersonula toruloidia
Rhizoctonia solani
Sclerotium rolfsii
Verticillium albo-atrum
Corynebacterium insidiosum
Corynebacterium michiganensis
Staphylococcus aureus Cells of the above organisms when sprayed on plates containing the antibiotic substance were killed as indicated by their failure to grow when transferred to fresh culture media. The antibiotic substance produced in accordance with my invention is useful, for example, as an industrial, household and/or clinical disinfectant and may be employed for sterilizing surgical and other medical equipment and supplies, dairy walls, household cooking utensils and the like.

Broadly stated, my invention includes the provision of the described antibiotic and a process comprising cultivating P. syringae in a suitable nutrient medium and separating from the resulting elaboration products the antibiotic substance produced by the P. syringae. The chemical identity of this antibiotic is at present unknown. It is a water- and acetone-soluble, white crystalline material, stable and biologically active in agar media for at least four hours at 80° C. and for at least three weeks at 250° C. Its stability to changes in pH is evidenced by the fact that it may be produced by the P. syringae on potato-dextrose agar media of pH 4.0 to 11.0. It has been found that increasing the concentration of the dextrose in such media in the presence of about 0.5% aspargine from an optimal ca. 1% to 5% in stepwise additions gradually inactivated the toxin or prevented its accumulation, indicating that the antibiotic affects carbohydrate metabolism of the pathogenic organisms. It is not a protein, as established by its solubility in solvents such as acetone, its nonionic nature, its heat stability, its failure to react with ninhydrin, and its ability to pass readily through dialyzing membranes.

Suitable nutrient media for inoculation with the P. syringae, and suitable methods of recovering the antibiotic produced therein by the P. syringae may be selected from among the media and methods of recovery now well known in the art. A preferred nutrient medium for use in the present invention is an aqueous nutrient medium, more particularly a broth containing boiled potatoes, dextrose and agar in suitable proportions in water. Similarly, although various methods of recovery are known, such as adsorption, fractional precipitation or crystallization, selective solvent extraction, etc., a chromatographic separation treatment is herein preferred. In such a recovery method, the aqueous phase in the culture medium containing the antibiotic substance is separated therefrom, as by centrifugation or the like, and the solute contained in said phase separated and subjected to chromatographic separation. The separation of the solute is of course not absolutely necessary, but should be carried out to facilitate the recovery and provide a practical and more economical process. Vacuum distillation may be employed, but a freeze-drying separation is preferred, after which the residue containing the antibiotic substance may be chromatographed or further treated or elaborated. Preferably, this residue is extracted with aqueous ethanol or other lower aliphatic alcohol and the resulting extract subjected to a suitable separation treatment to recover the antibiotic substance. As stated above, chromatography is preferred. A number of chromatographic separation methods are known, but paper chromatography is preferred for use herein, the chromatograms being developed by irrigation with aqueous alcohol solvent, e.g., aqueous butanol or ethanol or, preferably, aqueous butanol containing a minor proportion of ethanol. The antibiotic substance moves with the solvent front and is collected in the first portion of the solvent dripping from the bottom of the chromatograms, from which it is separated by evaporation.

The biological activity of the antibiotic substance may be assayed in known manner, preferably against cells of the fungus *Geotrichum candidum*. The following example is only illustrative of this invention, and is not to be regarded as limitative. It will be understood that all parts and proportions referred to herein are by weight unless otherwise indicated.

*Example*

Seed cultures of *P. syringae* isolate are grown on slants of potato-dextrose agar (broth from 200 grams of boiled potatoes, 10 grams of dextrose, and 15 grams of agar per aqueous leter of medium). One hundred Petri dishes containing 15 ml. amounts of this agar medium are streaked with the seed cultures and incubated for 5 days at 25° C. The agar cultures are then blendorized and the aqueous phase separated from the agar by ultracentrifugation (90,000 times gravity) for 40 minutes. The clear liquid phase is then freeze-dried and the residue extracted with three 25 ml. amounts of cold 70% ethanol. The combined ethanol extracts are then concentrated under reduced pressure to approximately 3–5 ml. and streaked on paper chromatograms. The chromatograms are irrigated with ethanol (1 vol.): butanol (4 vol.): water (5 vol.) for 18 hours at 25° C. Antibiotic moves with the solvent front on the chromatograms and is collected in the first 10–20 ml. of solvent which drips from the bottom of the chromatograms. Upon evaporation of the chromatography solvent from the collected sample, a white crystalline residue remains which contains the antibiotic. The activity of this material is assayed by placing microgram amounts of it on potato-dextrose agar and spraying the agar with cells of the fungus *Geotrichum candidum*. Within 24 hours the activity of the antibiotic is evident; all cells of *G. candidum* which are exposed to the antibiotic are killed whereas the other cells grow vigorously.

An aqueous solution containing, per ml. about 5 mg. of this antibiotic substance, when sprayed on glass, wood, plastic and/or metal surfaces as for example mirrors, windows, furniture, toys, and/or surgical scalpels contaminated with pathogenic organisms such as *Geotrichum candidum, Escherichia coli* and/or *Staphylococcus aureus,* is found to kill all cells of these organisms. Higher or lower concentrations, with or without common additives and assistants such as surface active agents, may of course also be employed.

This application is a continuation-in-part of my copending application Serial No. 835,186, filed on August 21, 1959, now abandoned.

This invention has been disclosed with respect to various preferred embodiments, and various modification and variations thereof will become obvious to persons skilled in the art. It will be understool that such modifications and variations are to be included within the spirit and scope of this invention.

What I claim is:

1. A process which comprises cultivating *Pesudomonas syringae* in a suitable aqueous nutrient medium and separating from the resulting elaboration products the antibiotic substance produced by the *Pseudomonas syringae.*

2. A process as defined in claim 1 wherein said nutrient medium is potato-dextrose agar.

3. A process which comprises cultivating *Pseudomonas syringae* in a suitable aqueous nutrient medium, separating the aqueous phase and subjecting said phase to a chromatographic separation treatment to recover therefrom the antibiotic substance produced in said medium by the *Pseudomonas syringae.*

4. A process as defined in claim 3 wherein said chromatographic separation treatment is paper chromatography.

5. A process which comprises cultivating *Pseudomonas syringae* in a suitable aqueous nutrient medium, separating and freeze-drying the aqueous phase, extracting the residue therefrom with aqueous ethanol, and recovering from the resulting extract the antibiotic substance produced in said medium by the *Pseudomonas syringae.*

6. A process which comprises cultivating *Pseudomonas syringae* in a suitable aqueous nutrient medium, separating and freeze-drying the aqueous phase, extracting the the resulting extract with aqueous ethanol, and subjecting the resulting extract to a chromatographic separation treatment to recover therefrom the antibiotic substance produced in said medium by the *Pseudomonas syringae.*

7. A process as defined in claim 6 wherein said chromatographic separation treatment is paper chromatography.

8. A process as defined in claim 7 wherein the chromatograms are irrigated with aqueous butanol-ethanol solvent.

9. The antibiotic substance produced by the process of claim 8.

10. A method for destroying pathogenic bacteria and fungi comprising contacting them with the antibiotic substance defined in claim 9.

References Cited in the file of this patent

Plant Diseases, The Yearbook of Agriculture, 1953, p. 727.